Feb. 7, 1933.  H. DRESPEL  1,896,772
DENTAL SLAB
Filed Jan. 16, 1932
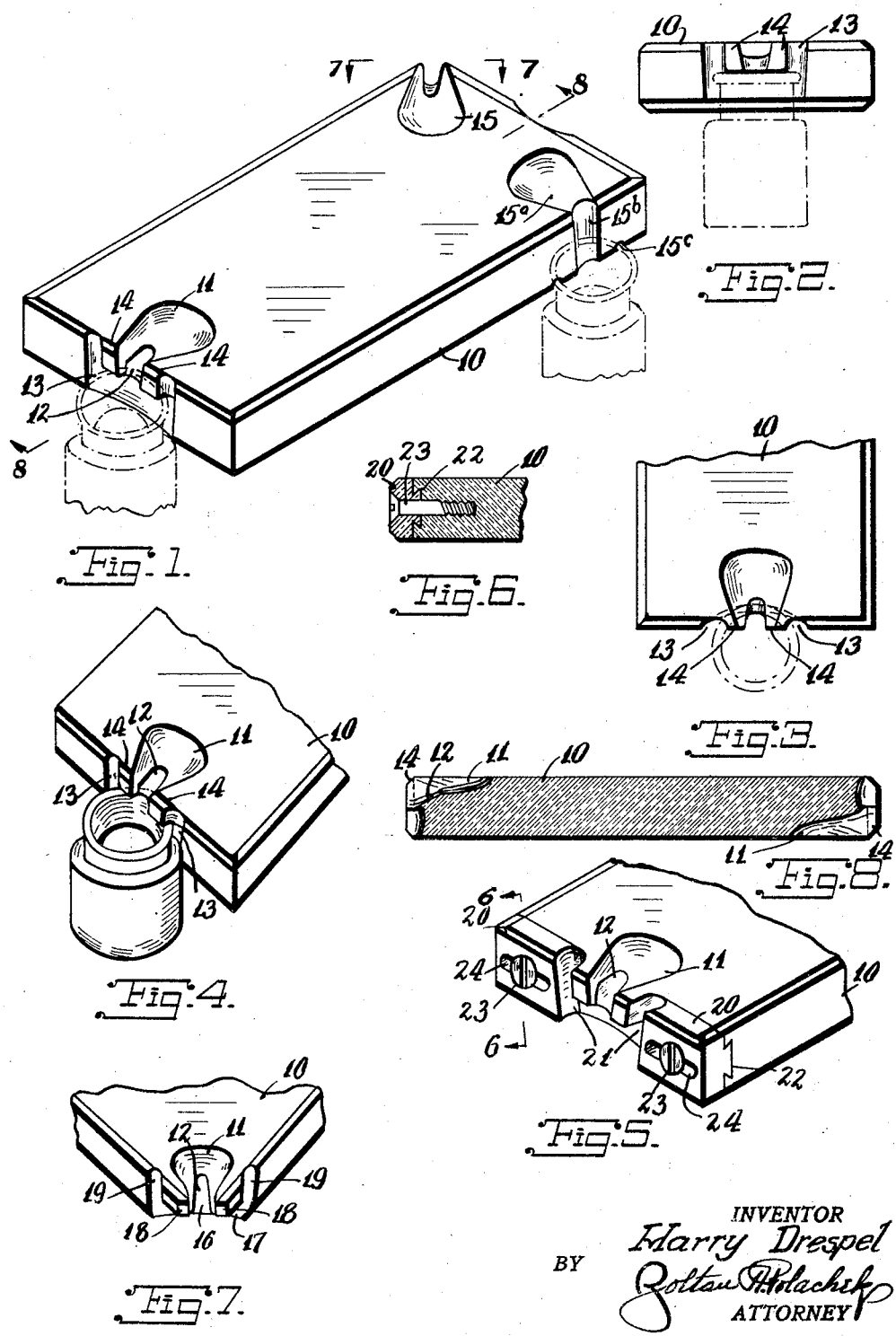
INVENTOR
*Harry Drespel*
BY
*Zoltan A. Polachek*
ATTORNEY Patented Feb. 7, 1933

1,896,772

UNITED STATES PATENT OFFICE

HARRY DRESPEL, OF BROOKLYN, NEW YORK

DENTAL SLAB

Application filed January 16, 1932. Serial No. 586,979.

This invention relates to new and useful improvements in a dental slab.

The invention has for an object the construction of a dental slab which is characterized by a funnel like cavity on the top extending to one side, and said side being formed with a recess of substantially U-shape, forming two projections at the mouth of the cavity so that chemicals from the slab may be readily replaced into the bottle from which they are taken and placed on the slab.

A still further object of this invention is to arrange the cavity of the recess upon one corner of the slab.

Another one of the objects of this invention is to provide adjustable sections on the slab adapted to be moved for the purpose of changing the size of the recess to accommodate bottles having different sized necks.

A still further object of this invention is the construction of an article of the class described which is of simple durable construction, dependable in use and efficient in operation and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a perspective view of a dental slab constructed according to this invention.

Fig. 2 is an edge elevational view of Fig. 1.

Fig. 3 is a plan view of a portion of Fig. 1.

Fig. 4 is a perspective view showing the slab tilted as though in a position to replace the chemical from it into a bottle.

Fig. 5 is a fragmentary perspective view similar to a portion of Fig. 1 but illustrating a modification.

Fig. 6 is a sectional view taken on the line 6—6 of Fig. 5.

Fig. 7 is a fragmentary perspective view looking in the direction of the line 7—7 of Fig. 1.

Fig. 8 is a longitudinal sectional view taken on the line 8—8 of Fig. 1.

The dental slab, according to this invention, comprises material 10 in the form of a dental slab and having a funnel-like cavity 11 on the top surface extending to one side of the slab and terminating in a discharge end 12. A recess 13 is formed in the side of the slab so as to form projections 14 on opposite sides of the discharge end 12. The recess 13 is of substantially U-shape so that the slab may be tilted as for example shown in Fig. 4, when the material on the slab is replaced into the bottle. The rim of the neck of the bottle will engage into the arms of the U-shaped recess 13 so that the projections 14 extend past the rim and allow proper discharge from the funnel shaped cavity into the bottle.

Another funnel-like cavity 15 is formed on the top surface of the dental slab near one corner and has a discharge end 16 terminating in the corner. A substantially U-shaped recess 17 is formed on the corner of the slab in a manner so that a pair of projections are formed which are on opposite sides of the discharge 16. The arms 19 from the U-shaped recess are disposed on different sides of the slab in a manner so that when the slab is tilted from the horizontal to aid in the discharge of material back into a bottle, the rim of the bottle may engage within the arms 19 to insure that the projections 18 extend slightly into the neck of the bottle and thus guide the discharge from the funnel-like cavity. In Figs. 1, 2 and 3 the dot and dash lines indicate a bottle placed beneath the projections 14 in a position before the slab is tilted upwards as shown in Fig. 4. Another cavity 15$^a$ is shown with a vertical groove 15$^b$ on the side of the dental slab. A circular groove 15$^c$ is provided under groove 15$^b$, in the bottom face of the slab 10, to position the neck of the bottle.

The cavity 11 may be on either face of the slab 10 or on both faces at the opposite edges, so that the slab may be reversed and either face may be used.

In Figs. 5 and 6 an arrangement has been disclosed in which provision has been made for adapting the dental slab, according to this invention, to bottles having necks of different diameters. Examining Fig. 4, it will be seen that if the diameter of the top of the neck of the bottle is too large, the slab will not be able to be tilted so that the arms of the U-shaped recess engage the rim of the bottle. Accordingly, the slab 10 is provided with sections 20 which are adjustably mounted. The inner sides 21 of the sections 20 form the other sides of the arms of the U-shaped recess. Each of the sections 20 have tongues 22 engageable in slots formed in the slab 10 so that the sections 20 may be adjusted laterally only. Screws 23 engage through slots 24 in the sections so as to adjustably hold the sections in positions. Should it be desirable to increase the width of the U-shaped recess, the screws 23 should be loosened and the sections 20 moved away from each other.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim is new, and desire to secure by United States Letters Patent is:—

1. A dental slab, comprising material in the form of a dental slab and having a funnel-like cavity on the top surface extending to one side and terminating in a small discharge end, and said side of the dental slab being formed with a substantially U-shaped recess arranged in a manner so as to produce a pair of projections on opposite sides of the mouth of said cavity.

2. A dental slab, comprising material in the form of a dental slab and having a funnel-like cavity on the top surface extending to one side and terminating in a small discharge end, and said side of the dental slab being formed with a substantially U-shaped recess arranged in a manner so as to produce a pair of projections on opposite sides of the mouth of said cavity, the arms of said U-shaped cavity extending to the top surface of the slab.

3. A dental slab, comprising material in the form of a dental slab and formed with a funnel-like cavity on the top surface extending to one corner, and said corner being recessed with a substantially U-shaped recess having a pair of arms extending into the top surface of the slab.

4. A dental slab, comprising material in the form of a dental slab and formed with a funnel-like cavity on the top surface extending to one corner, and said corner being recessed with a substantially U-shaped recess having a pair of arms extending into the top surface of the slab, one of said arms being on one side of the slab and the other on the other side.

5. A dental slab, comprising material in the form of a dental slab and formed with a funnel-like cavity on the top surface extending to one corner, and said corner being recessed with a substantially U-shaped recess having a pair of arms extending into the top surface of the slab, said arms and recess dividing off a pair of projections from the slab.

6. A dental slab, comprising material in the form of a dental slab and having a funnel-like cavity on the top surface extending to one side and terminating a small discharge end, and said side of the dental slab being formed with a substantially U-shaped recess arranged in a manner so as to produce a pair of projections on opposite sides of the mouth of said cavity, said dental slab being formed with movable sections the sides of which form the sides of said recess.

7. A dental slab, comprising material in the form of a dental slab and having a funnel-like cavity on the top surface extending to one side and terminating in a small discharge end, and said side of the dental slab being formed with a substantially U-shaped recess arranged in a manner so as to produce a pair of projections on opposite sides of the mouth of said cavity, said dental slab being formed with movable sections the sides of which form the sides of said recess, and means for limiting motion of said sections laterally only.

In testimony whereof I have affixed my signature.

HARRY DRESPEL.